(12) United States Patent
Oiwa et al.

(10) Patent No.: US 9,656,840 B2
(45) Date of Patent: May 23, 2017

(54) WORK VEHICLE AND CONTROL METHOD FOR WORK VEHICLE

(71) Applicant: Komatsu Ltd., Tokyo (JP)

(72) Inventors: Taishi Oiwa, Naka-gun (JP); Shinji Kaneko, Oyama (JP)

(73) Assignee: Komatsu Ltd., Tokyo (JP)

( * ) Notice: Subject to any disclaimer, the term of this patent is extended or adjusted under 35 U.S.C. 154(b) by 95 days.

(21) Appl. No.: 14/422,877

(22) PCT Filed: Oct. 8, 2014

(86) PCT No.: PCT/JP2014/076920
§ 371 (c)(1),
(2) Date: Feb. 20, 2015

(87) PCT Pub. No.: WO2016/056079
PCT Pub. Date: Apr. 14, 2016

(65) Prior Publication Data
US 2016/0257538 A1   Sep. 8, 2016

(51) Int. Cl.
*G06F 7/70* (2006.01)
*F16D 39/00* (2006.01)
(Continued)

(52) U.S. Cl.
CPC ............ *B66F 9/07572* (2013.01); *B66F 9/07* (2013.01); *F16H 61/431* (2013.01); *F16H 61/438* (2013.01); *B60Y 2200/15* (2013.01)

(58) Field of Classification Search
USPC ................................ 701/50; 60/487; 180/197
See application file for complete search history.

(56) References Cited

U.S. PATENT DOCUMENTS

| 4,769,774 A | 9/1988 | Narita et al. |
| 5,784,883 A | 7/1998 | Ohkura et al. |

(Continued)

FOREIGN PATENT DOCUMENTS

| CN | 102549313 A | 7/2012 |
| CN | 102829175 A | 12/2012 |

(Continued)

OTHER PUBLICATIONS

International Search Report and Written Opinion mailed Jan. 20, 2015, issued for PCT/JP2014/076920.
(Continued)

*Primary Examiner* — Tyler Paige
(74) *Attorney, Agent, or Firm* — Locke Lord LLP

(57) ABSTRACT

A work vehicle obtains determination information from information upon detecting inverting operation, the information upon detecting inverting operation indicating a traveling state of the work vehicle when an advancing direction detection device detects an inverting operation of an advancing direction switching device for inverting an advancing direction of the work vehicle while the work vehicle travels; decreases a first traveling instruction for allowing the work vehicle to travel in the advancing direction of the work vehicle upon the detection of the inverting operation, and increases a second traveling instruction for allowing the work vehicle to travel in the direction opposite to the advancing direction of the work vehicle upon the detection of the inverting operation, after detecting the inverting operation; and sets the first traveling instruction to 0 when speed information indicating a traveling state of the work vehicle becomes the determination information.

7 Claims, 7 Drawing Sheets

(51) Int. Cl.
*B60K 28/16* (2006.01)
*B66F 9/075* (2006.01)
*F16H 61/438* (2010.01)
*F16H 61/431* (2010.01)
*B66F 9/07* (2006.01)

(56) References Cited

U.S. PATENT DOCUMENTS

| | | | | |
|---|---|---|---|---|
| 6,231,467 | B1* | 5/2001 | Korner | B60T 1/087 |
| | | | | 475/113 |
| 6,782,961 | B1* | 8/2004 | Ishikawa | B60K 28/16 |
| | | | | 180/197 |
| 8,342,284 | B2 | 1/2013 | Takahashi et al. | |
| 9,194,475 | B2 | 11/2015 | Matsuzaki et al. | |
| 2004/0249538 | A1* | 12/2004 | Osaki | B66F 9/24 |
| | | | | 701/50 |
| 2009/0071143 | A1* | 3/2009 | Foster | F16H 61/47 |
| | | | | 60/445 |
| 2010/0083652 | A1* | 4/2010 | Fukuda | F16H 61/4008 |
| | | | | 60/487 |
| 2010/0174456 | A1* | 7/2010 | Beaudoin | B60W 10/06 |
| | | | | 701/51 |
| 2011/0226089 | A1* | 9/2011 | Riedel | F16H 57/0413 |
| | | | | 74/606 A |
| 2012/0152641 | A1 | 6/2012 | Takahashi et al. | |
| 2012/0322615 | A1 | 12/2012 | Matsuzaki et al. | |
| 2013/0184948 | A1* | 7/2013 | Anderson | F16H 59/06 |
| | | | | 701/55 |
| 2013/0218428 | A1* | 8/2013 | Onodera | F16H 61/421 |
| | | | | 701/54 |
| 2016/0059862 | A1 | 3/2016 | Matsuzaki et al. | |
| 2016/0082966 | A1* | 3/2016 | Kaneko | B60W 30/188 |
| | | | | 701/84 |

FOREIGN PATENT DOCUMENTS

| | | |
|---|---|---|
| CN | 103486240 A | 1/2014 |
| DE | 69529484 T2 | 11/2003 |
| JP | 61-041628 A | 2/1986 |
| JP | 05-280635 A | 10/1993 |
| JP | 06-058407 A | 3/1994 |
| JP | 06-280997 | 10/1994 |
| JP | 2012-057502 A | 3/2012 |

OTHER PUBLICATIONS

Office Action dated Nov. 5, 2015, issued for the German Patent Application No. 11 2014 000 203.8 and English translation thereof.

\* cited by examiner

| Vca | 0 | Vca1 | Vca2 | Vca3 |
|-----|-----|------|------|------|
| Vch | Vch0 | Vch1 | Vch2 | Vch3 |

50

WORK VEHICLE AND CONTROL METHOD FOR WORK VEHICLE

FIELD

The present invention relates to a work vehicle including a variable displacement hydraulic pump driven by an engine, and a hydraulic motor that forms a closed circuit with the hydraulic pump and is driven by operating oil discharged from the hydraulic pump, and a control method for a work vehicle.

BACKGROUND

There is a forklift including a hydraulic drive device called an HST (Hydro Static Transmission) mounted between an engine, which is a drive source, and drive wheels (for example, Patent Literature 1). In the HST, a variable displacement traveling hydraulic pump driven by an engine and a variable displacement hydraulic motor driven by operating oil discharged from the traveling hydraulic pump are provided to a main hydraulic circuit that is a closed circuit. The HST allows a vehicle to travel by transmitting driving force of the hydraulic motor to the drive wheels.

CITATION LIST

Patent Literature

Patent Literature 1: Japanese Unexamined Patent Publication No. 2012-57502

SUMMARY

Technical Problem

A work vehicle such as a forklift performs a switchback operation. During the switchback operation, a traveling speed of the work vehicle in a forward direction or a traveling speed of the work vehicle in a reverse direction is increased, just after the traveling speed of the work vehicle in the reverse direction or the traveling speed of the work vehicle in the forward direction is decreased to stop the work vehicle by an operation of a forward/reverse lever to a forward side from a reverse side during the movement in the reverse direction or by an operation of the forward/reverse lever to a reverse side from a forward side during the movement in the forward direction. When a work vehicle traveling with relatively high speed performs a switchback operation, working efficiency of the work vehicle is deteriorated due to a time lag generated from the time when an instruction for an advancing direction is switched till the advancing direction is actually switched. When a work vehicle traveling with relatively low speed performs a switchback operation, the work vehicle is often required to have precision motion such that the work vehicle moves precisely according to a fine operation of an operator of the work vehicle. When shock occurs on the work vehicle during the switchback operation in such case, the forklift is difficult to perform precision work.

The present invention aims to prevent a time lag and reduce shock, when a work vehicle including an HST performs a switchback operation.

Solution to Problem

According to the present invention, a work vehicle including a work machine, the work vehicle comprises: a hydraulic motor that drives a drive wheel for moving the work vehicle; a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil; an advancing direction detection device that detects a state of an advancing direction switching device for switching a forward movement and a reverse movement of the work vehicle; and a control device that supplies a traveling instruction for allowing the work vehicle to travel to a drive device of the operation mechanism to operate the operation mechanism in order to discharge the operating oil from the traveling hydraulic pump, wherein an operation amount of the operation mechanism is determined by the traveling instruction and a load of the closed circuit, and the control device obtains determination information from information upon detecting inverting operation, the information upon detecting inverting operation indicating a traveling state of the work vehicle when the advancing direction detection device detects an inverting operation of the advancing direction switching device for inverting the advancing direction of the work vehicle while the work vehicle travels, the control device decreases a first traveling instruction for allowing the work vehicle to travel in the advancing direction of the work vehicle upon the detection of the inverting operation, and increases a second traveling instruction for allowing the work vehicle to travel in the direction opposite to the advancing direction of the work vehicle upon the detection of the inverting operation, after detecting the inverting operation, and the control device sets the first traveling instruction to 0 when speed information indicating a traveling state of the work vehicle becomes the determination information.

In the present invention, it is preferable that the determination information increases, as the information upon detecting inverting operation increases.

In the present invention, it is preferable that the information upon detecting inverting operation, the determination information, and the speed information are a speed.

In the present invention, it is preferable that the work machine includes a fork on which a cargo is loaded, and the work vehicle is a forklift.

According to the present invention, A work vehicle including a fork on which a cargo is loaded, the work vehicle comprises: a hydraulic motor that drives a drive wheel for moving the work vehicle; a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil; a drive device that operates the operation mechanism by operating oil; an advancing direction detection device that detects a state of an advancing direction switching device for switching a forward movement and a reverse movement of the work vehicle; and a control device that supplies a traveling instruction for allowing the work vehicle to travel to the drive device to operate the operation mechanism in order to discharge the operating oil from the traveling hydraulic pump, wherein an operation amount of the operation mechanism is determined by the traveling instruction and a load of the closed circuit, and the control device obtains determination speed from a speed upon detecting inverting operation, the speed upon detecting inverting operation being a speed of the work vehicle when the advancing direction detection device detects an inverting operation of the advancing direction switching device for inverting the advancing direction of the work vehicle while the work vehicle travels, the control device decreases a first traveling instruction for allowing the work vehicle to travel in the advancing direction of the work vehicle upon the detection of the inverting operation, and increases a second traveling instruction for allowing the work vehicle to travel in the direction opposite to the advancing direction of the work vehicle upon the detection of the inverting operation, after detecting the inverting operation, the control device sets the first traveling instruction to 0 when the speed of the work vehicle becomes the determination speed, and the control device sets the first traveling instruction to 0 in a case where the speed of the work vehicle is not more than a predetermined value, a pressure at an intake side of the traveling hydraulic pump is not more than a predetermined value, a pressure at a discharge side of the traveling hydraulic pump is not more than a predetermined value, and a pressure of the operating oil generated by the drive device is not more than a predetermined value, when the inverting operation is detected upon an occurrence of abnormality on a device detecting the speed.

According to the present invention, a control method for a work vehicle including a work machine; a hydraulic motor that drives a drive wheel for moving the work vehicle; a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil; an advancing direction detection device that detects a state of an advancing direction switching device for switching a forward movement and a reverse movement of the work vehicle; and a control device that supplies a traveling instruction for allowing the work vehicle to travel to a drive device of the operation mechanism to operate the operation mechanism in order to discharge the operating oil from the traveling hydraulic pump, an operation amount of the operation mechanism being determined by the traveling instruction and a load of the closed circuit, the control method comprises: obtaining determination information from information upon detecting inverting operation, the information upon detecting inverting operation indicating a traveling state of the work vehicle when the advancing direction detection device detects an inverting operation of the advancing direction switching device for inverting the advancing direction of the work vehicle while the work vehicle travels, decreasing a first traveling instruction for allowing the work vehicle to travel in the advancing direction of the work vehicle upon the detection of the inverting operation, and increasing a second traveling instruction for allowing the work vehicle to travel in the direction opposite to the advancing direction of the work vehicle upon the detection of the inverting operation, after the detection of the inverting operation, and setting the first traveling instruction to 0 when speed information indicating a traveling state of the work vehicle becomes the determination information.

Advantageous Effects of Invention

The present invention can prevent a time lag and reduce shock, when a work vehicle including an HST performs a switchback operation.

DESCRIPTION OF EMBODIMENT

An Embodiment for carrying out the present invention will be described below with reference to the drawings.

<Forklift>

Figure 1:
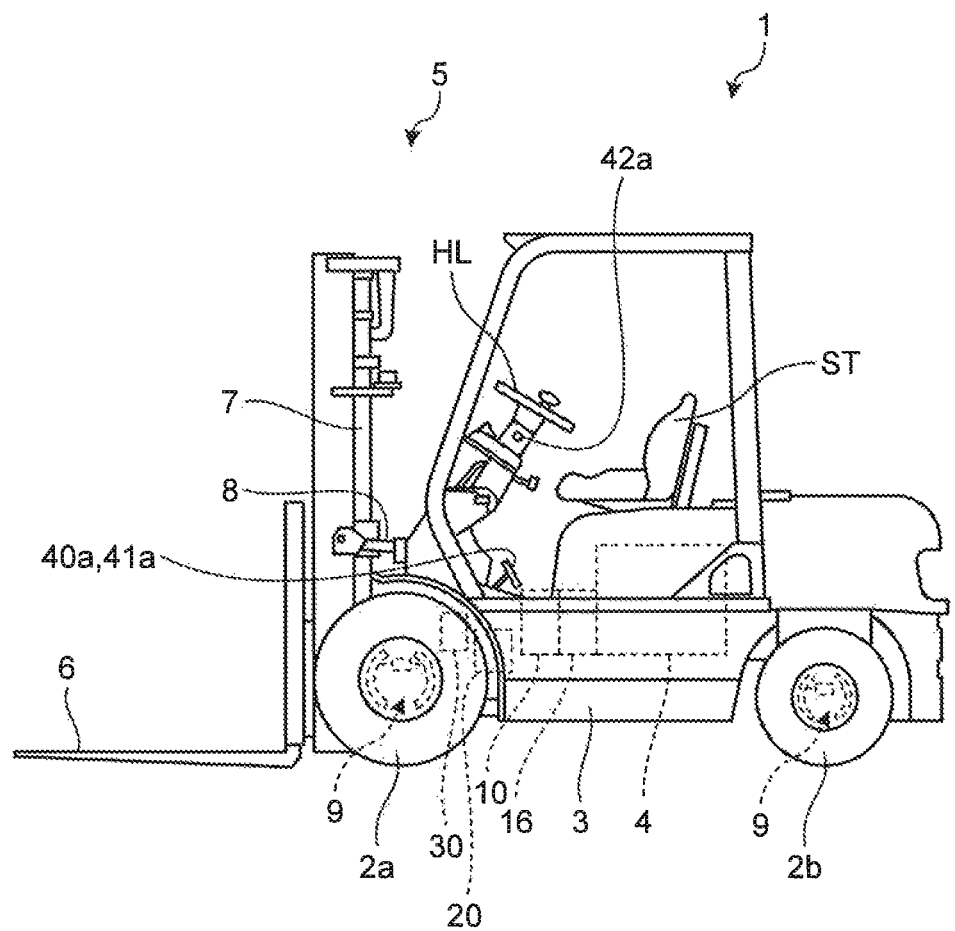
FIG. 1 is a view illustrating an entire configuration of a forklift according to an embodiment of the present invention.
Figure 2:
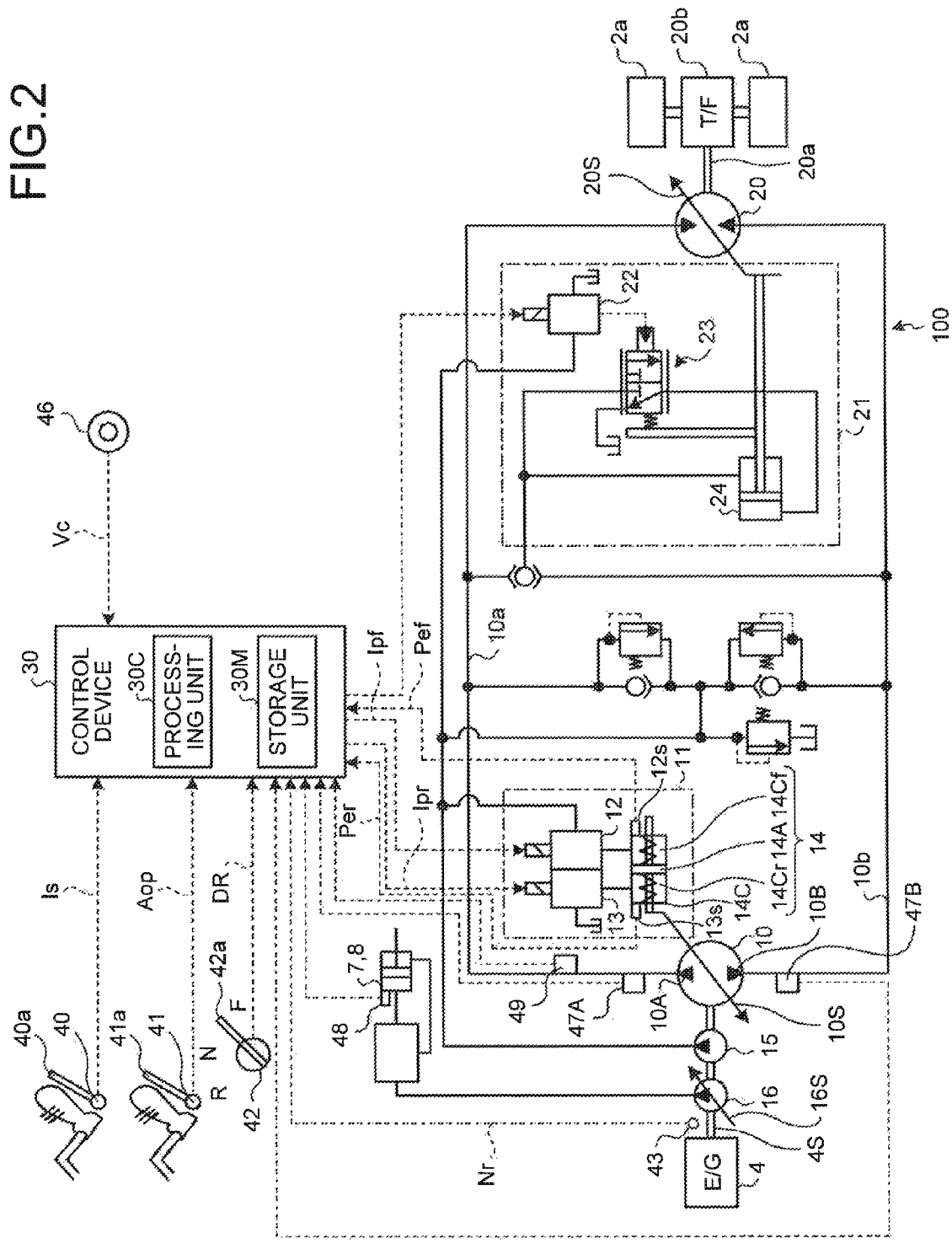
FIG. 2 is a block diagram illustrating a control system of the forklift illustrated in FIG. 1.

FIG. 1 is a view illustrating an entire configuration of a forklift 1 according to an embodiment of the present invention. FIG. 2 is a block diagram illustrating a control system of the forklift 1 illustrated in FIG. 1. The forklift 1 includes a body 3 having drive wheels 2a and steered wheels 2b, a work machine 5, and a mechanical brake 9 that stops the drive wheels 2a and the steered wheels 2b. In the forklift 1, the side from a driver's seat ST to a steering member HL is a front side, while the side from the steering member HL to the driver's seat ST is a back side. The work machine 5 is provided in front of the body 3.

An engine 4 that is one example of an internal combustion engine, a variable displacement traveling hydraulic pump 10, and a work machine hydraulic pump 16 are mounted on the body 3, the traveling hydraulic pump 10 and the work machine hydraulic pump 16 being driven by using the engine 4 as a drive source. The engine 4 is a diesel engine, for example. However, the engine is not limited thereto. An output shaft 4S of the engine 4 is connected to the traveling hydraulic pump 10 and the work machine hydraulic pump 16. The traveling hydraulic pump 10 and the work machine hydraulic pump 16 are driven by the engine 4 via the output shaft 4S. The drive wheels 2a are driven by power of a hydraulic motor 20. The variable displacement traveling hydraulic pump 10 and the variable displacement hydraulic motor 20 are communicated with each other by a closed hydraulic circuit to form an HST. In this way, the forklift 1 travels with the HST. In the present embodiment, the traveling hydraulic pump 10 and the work machine hydraulic pump 16 both have a swash plate 10S and a swash plate 16S. Their capacities are changed by changing tilt angles of the swash plates 10S and 16S.

The work machine 5 includes a fork 6 on which a cargo is loaded, and a lift mechanism that moves the fork 6 up and down. The lift mechanism includes a lift cylinder 7 and a tilt cylinder 8 that tilts the fork 6. A forward/reverse lever 42a, an inching pedal (brake pedal) 40a serving as a brake operation unit, an accelerator pedal 41a serving as an accelerator operation unit, and an unillustrated work machine operation lever including a lift lever and a tilt lever for operating the work machine 5 are provided on the driver's seat on the body 3. The inching pedal 40a changes an inching rate. The accelerator pedal 41a changes a supply amount of fuel to the engine 4. The inching pedal 40a and the accelerator pedal 41a are provided at a position where an operator of the forklift 1 can perform a pedal operation from the driver's seat. FIG. 1 illustrates that the inching pedal 40a and the accelerator pedal 41a are overlapped with each other.

As illustrated in FIG. 2, the forklift 1 includes the engine 4, an output shaft 20a, a transfer 20b, the drive wheels 2a and 2a, the lift cylinder 7 that drives the work machine 5, the tilt cylinder 8, a control device 30, and a main hydraulic circuit 100. The main hydraulic circuit 100 is a closed circuit including the traveling hydraulic pump 10, the hydraulic motor 20, and hydraulic supply conduits 10a and 10b that connect the traveling hydraulic pump 10 and the hydraulic motor 20.

The traveling hydraulic pump 10 forms a closed circuit with the hydraulic motor 20. The traveling hydraulic pump 10 is driven by the engine 4 to discharge operating oil, thereby driving the hydraulic motor 20. In the present embodiment, the traveling hydraulic pump 10 including the swash plate 10S is a variable displacement pump that can change its capacity by changing a tilt angle of the swash plate, for example. The swash plate 10S is an operation mechanism that changes the capacity of the traveling hydraulic pump 10 and also changes a rotating direction of the hydraulic motor 20 by inverting an intake side and a discharge side of the operating oil.

In the traveling hydraulic pump 10, the portion connected to the hydraulic supply conduit 10a is an A port 10A, and the portion connected to the hydraulic supply conduit 10b is a B port 10B. Upon the movement of the forklift 1 in the forward direction, the operating oil is discharged from the A port 10A, and is flown into the B port 10B. Upon the movement of the forklift 1 in the reverse direction, the operating oil is flown into the A port 10A, and is discharged from the B port 10B.

The hydraulic motor 20 is rotated by the operating oil discharged from the traveling hydraulic pump 10. For example, the hydraulic motor 20 including a swash plate 20S is a variable displacement hydraulic motor that can change its capacity by changing a tilt angle of the swash plate. The hydraulic motor 20 may be a fixed displacement hydraulic motor. An output shaft 20a of the hydraulic motor 20 is connected to the drive wheels 2a via the transfer 20b. The hydraulic motor 20 rotates the drive wheels 2a via the transfer 20b to allow the forklift 1 to travel.

The hydraulic motor 20 can switch the rotating direction according to the supply direction of the operating oil from the traveling hydraulic pump 10. The forklift 1 travels in the forward direction or in the reverse direction by switching the rotating direction of the hydraulic motor 20. In the description below, it is supposed that the forklift 1 travels in the forward direction when the operating oil is supplied to the hydraulic motor 20 from the hydraulic supply conduit 10a, and the forklift 1 travels in the reverse direction when the operating oil is supplied to the hydraulic motor 20 from the hydraulic supply conduit 10b, for the sake of convenience.

The forklift 1 includes a pump capacity setting unit 11, a motor capacity setting unit 21, and a charge pump 15. The pump capacity setting unit 11 is provided in the traveling hydraulic pump 10. The pump capacity setting unit 11 includes a forward pump solenoid proportional control valve 12, a reverse pump solenoid proportional control valve 13, and a pump capacity control cylinder 14. The forward pump solenoid proportional control valve 12 and the reverse pump solenoid proportional control valve 13 in the pump capacity setting unit 11 receive an instruction signal from a later-described control device 30. In the pump capacity setting unit 11, the pump capacity control cylinder 14 operates according to the instruction signal supplied from the control device 30 to change the tilt angle of the swash plate of the traveling hydraulic pump 10, whereby the capacity of the traveling hydraulic pump 10 is changed. As described above, the pump capacity setting unit 11 is a drive device that operates an operation mechanism, i.e., the swash plate 10S of the traveling hydraulic pump 10, by the operating oil.

The pump capacity control cylinder 14 has a piston 14A stored in a cylinder case 14C. The piston 14A reciprocates in the cylinder case 14C by the supply of the operating oil in a space between the cylinder case 14C and the piston 14A. The cylinder case 14C is divided into a first operating-oil chamber 14Cf and a second operating-oil chamber 14Cr by the piston 14A. The forward pump solenoid proportional control valve 12 is connected to the first operating-oil chamber 14Cf, and the reverse pump solenoid proportional control valve 13 is connected to the second operating-oil chamber 14Cr. The forward pump solenoid proportional control valve 12 supplies operating oil to the first operating-oil chamber 14Cf, and the operating oil in the first operating-oil chamber 14Cf is discharged to the forward pump solenoid proportional control valve 12. The reverse pump solenoid proportional control valve 13 supplies operating oil to the second operating-oil chamber 14Cr, and the operating oil in the second operating-oil chamber 14Cr is discharged to the reverse pump solenoid proportional control valve 13.

When the operating oil is supplied to the first operating-oil chamber 14Cf from the forward pump solenoid proportional control valve 12, the piston 14A moves toward the second operating-oil chamber 14Cr to open the swash plate 10S in the traveling hydraulic pump 10. When the operating oil is supplied to the second operating-oil chamber 14Cr from the reverse pump solenoid proportional control valve 13, the piston 14A moves toward the first operating-oil chamber 14Cf to open the swash plate 10S in the traveling hydraulic pump 10. In the pump capacity control cylinder 14, the piston 14A is held at a neutral position when the tilt angle of the swash plate is 0. Therefore, even when the engine 4 rotates, the amount of the operating oil discharged to the hydraulic supply conduit 10a or the hydraulic supply conduit 10b in the main hydraulic circuit 100 from the traveling hydraulic pump 10 is 0.

It is supposed that an instruction signal to increase the capacity of the traveling hydraulic pump 10 is supplied to the forward pump solenoid proportional control valve 12 from the control device 30 from the state where the tilt angle of the swash plate of the traveling hydraulic pump 10 is 0, for example. In this case, the forward pump solenoid proportional control valve 12 applies a pump control pressure to the pump capacity control cylinder 14 according to this instruction signal. As a result, the piston 14A moves to the left in FIG. 2. When the piston 14A in the pump capacity control cylinder 14 moves to the left in FIG. 2, the swash plate 10S of the traveling hydraulic pump 10 tilts toward the direction of discharging the operating oil to the hydraulic supply conduit 10a in response to this motion.

As the pump control pressure from the forward pump solenoid proportional control valve 12 increases, i.e., when the pressure of the operating oil increases, the moving amount of the piston 14A increases. Therefore, the amount of change in the tilt angle of the swash plate 10S in the traveling hydraulic pump 10 also increases. Specifically, when the instruction signal (traveling instruction) Ipf is supplied to the forward pump solenoid proportional control valve 12 from the control device 30, the pump control pressure based on this instruction signal Ipf is applied to the pump capacity control cylinder 14 from the forward pump solenoid proportional control valve 12. When the pump capacity control cylinder 14 operates by the above pump control pressure, the swash plate 10S in the traveling hydraulic pump 10 tilts so as to be capable of discharging a predetermined amount of operating oil to the hydraulic supply conduit 10a. Thus, if the engine 4 rotates, the operating oil is discharged from the traveling hydraulic pump 10 to the hydraulic supply conduit 10a, whereby the hydraulic motor 20 rotates in the forward direction.

When an instruction signal Ipf to decrease the capacity of the traveling hydraulic pump 10 is supplied to the forward pump solenoid proportional control valve 12 from the control device 30 from the above-mentioned state, the pump control pressure applied to the pump capacity control cylinder 14 from the forward pump solenoid proportional control valve 12 decreases in response to this instruction signal Ipf. Therefore, the piston 14A in the pump capacity control cylinder 14 moves to the neutral position. As a result, the tilt angle of the swash plate in the traveling hydraulic pump 10 decreases, so that the discharging amount of the operating oil from the traveling hydraulic pump 10 to the hydraulic supply conduit 10a decreases.

When the control device 30 supplies an instruction signal Ipr to increase the capacity of the traveling hydraulic pump 10 to the reverse pump solenoid proportional control valve 13, the reverse pump solenoid proportional control valve 13 applies a pump control pressure, i.e., the pressure of the operating oil, to the pump capacity control cylinder 14 in response to this instruction signal Ipr. Therefore, the piston 14A moves to the right in FIG. 2. When the piston 14A in the pump capacity control cylinder 14 moves to the right in FIG. 2, the swash plate 10S of the traveling hydraulic pump 10 tilts toward the direction of discharging the operating oil to the hydraulic supply conduit 10b in response to this motion.

As the pump control pressure from the reverse pump solenoid proportional control valve 13 increases, the moving amount of the piston 14A increases. Therefore, the amount of change in the tilt angle of the swash plate in the traveling hydraulic pump 10 also increases. Specifically, when the instruction signal Ipr is supplied to the reverse pump solenoid proportional control valve 13 from the control device 30, the pump control pressure based on this instruction signal Ipr is applied to the pump capacity control cylinder 14 from the reverse pump solenoid proportional control valve 13. When the pump capacity control cylinder 14 operates, the swash plate 10S in the traveling hydraulic pump 10 tilts so as to be capable of discharging a desired amount of operating oil to the hydraulic supply conduit 10b. Thus, if the engine 4 rotates, the operating oil is discharged from the traveling hydraulic pump 10 to the hydraulic supply conduit 10b, whereby the hydraulic motor 20 rotates in the reverse direction.

When an instruction signal Ipr to decrease the capacity of the traveling hydraulic pump 10 is supplied to the reverse pump solenoid proportional control valve 13 from the control device 30, the pump control pressure applied to the pump capacity control cylinder 14 from the reverse pump solenoid proportional control valve 13 decreases in response to this instruction signal Ipr. Therefore, the piston 14A moves to the neutral position. As a result, the tilt angle of the swash plate in the traveling hydraulic pump 10 decreases, so that the discharging amount of the operating oil from the traveling hydraulic pump 10 to the hydraulic supply conduit 10b decreases.

The pump control pressure from the forward pump solenoid proportional control valve 12 can be pressure of the operating oil in the first operating-oil chamber 14Cf, for example. The pump control pressure from the reverse pump solenoid proportional control valve 13, i.e., the pressure of the operating oil, can be pressure of the operating oil in the second operating-oil chamber 14Cr, for example. The pressure Pef of the operating oil in the first operating-oil chamber 14Cf is detected by a first pressure sensor 12s serving as a pressure detecting device, and the pressure Per of the operating oil in the second operating-oil chamber 14Cr is detected by a second pressure sensor 13s serving as the pressure detecting device. The detection values of the first pressure sensor 12s and the second pressure sensor 13s are inputted to the control device 30.

The motor capacity setting unit 21 is provided on the hydraulic motor 20. The motor capacity setting unit 21 includes a motor solenoid proportional control valve 22, a motor cylinder control valve 23, and a motor capacity control cylinder 24. When an instruction signal is supplied from the control device 30 to the motor solenoid proportional control valve 22 in the motor capacity setting unit 21, a motor control pressure is applied to the motor cylinder control valve 23 from the motor solenoid proportional control valve 22, whereby the motor capacity control cylinder 24 operates. When the motor capacity control cylinder 24 operates, the tilt angle of the swash plate in the hydraulic motor 20 is changed in response to the motion of the motor capacity control cylinder 24. Therefore, the capacity of the hydraulic motor 20 is changed in response to the instruction signal from the control device 30. Specifically, the tilt angle of the swash plate in the hydraulic motor 20 decreases, as the motor control pressure applied from the motor solenoid proportional control valve 22 in the motor capacity setting unit 21 increases.

The charge pump 15 is driven by the engine 4. The charge pump 15 applies the pump control pressure to the pump capacity control cylinder 14 via the forward pump solenoid proportional control valve 12 and the reverse pump solenoid proportional control valve 13 described above. The charge pump 15 has a function of applying the motor control pressure to the motor cylinder control valve 23 via the motor solenoid proportional control valve 22.

In the present embodiment, the engine 4 drives the work machine hydraulic pump 16 as well as the traveling hydraulic pump 10. The work machine hydraulic pump 16 supplies operating oil to the lift cylinder 7 and the tilt cylinder 8, which are working actuators for driving the work machine 5, via a valve.

The forklift 1 includes an inching potentiometer (brake potentiometer) 40, an accelerator potentiometer 41, a forward/reverse lever switch 42, an engine rotation sensor 43, a speed sensor 46, pressure sensors 47A and 47B, a pressure sensor 48, and a temperature sensor 49.

When the inching pedal (brake pedal) 40a is operated, the inching potentiometer 40 detects its operation amount and outputs the detected amount. The operation amount of the inching pedal 40a is an inching operation amount Is. The inching operation amount Is outputted from the inching potentiometer 40 is inputted to the control device 30. The inching operation amount Is is sometimes referred to as an inching stroke Is in the description below.

When the accelerator pedal 41a is operated, the accelerator potentiometer 41 outputs an operation amount Aop of the accelerator pedal 41a. The operation amount Aop of the accelerator pedal 41a is also referred to as an accelerator opening Aop. The accelerator opening Aop outputted from the accelerator potentiometer 41 is inputted to the control device 30.

The forward/reverse lever switch 42 is an advancing direction detecting device for switching the advancing direction of the forklift 1 to a forward direction or a reverse direction. The present embodiment employs the forward/reverse lever switch 42 including a forward/reverse lever 42a provided at the position where a driver can perform a selecting operation from the driver's seat. The driver operates the forward/reverse lever 42a to select any one of three directions, which are the forward direction, the neutral position, and the reverse direction, thereby being capable of switching the direction of the forklift 1 to the forward direction or the reverse direction. The forward/reverse lever 42a is an advancing direction switching device for switching the advancing direction of the forklift 1 to the forward direction or the reverse direction. Information indicating the advancing direction of the forklift 1 selected by the forward/reverse lever switch 42 is supplied to the control device 30 from the forward/reverse lever switch 42 as an advancing direction instruction value DR. In the advancing direction instruction value DR, F indicates the forward direction, N indicates the neutral direction, and R indicates the reverse direction. The advancing direction of the forklift 1 selected by the forward/reverse lever switch 42 includes both the direction in which the forklift 1 is to travel and the direction in which the forklift 1 is now traveling.

The engine rotation sensor 43 detects an actual rotating speed of the engine 4. The rotating speed of the engine 4 detected by the engine rotation sensor 43 is an actual rotating speed Nr of the engine 4. Information indicating the actual rotating speed Nr of the engine 4 is inputted to the control device 30. The rotating speed of the engine 4 is an engine speed of the output shaft 4S of the engine 4 per a unit time. The speed sensor 46 is a device detecting a traveling speed of the forklift 1, i.e., a speed Vc.

The pressure sensor 47A is provided to the hydraulic supply conduit 10a to detect the pressure of the operating oil in the hydraulic supply conduit 10a. The pressure sensor 47B is provided to the hydraulic supply conduit 10b to detect the pressure of the operating oil in the hydraulic supply conduit 10b. The pressure detected by the pressure sensor 47A corresponds to the pressure of the operating oil in the A port 10A of the traveling hydraulic pump 10. The pressure detected by the pressure sensor 47B corresponds to the pressure of the operating oil in the B port 10B of the traveling hydraulic pump 10. The control device 30 acquires the detection values of the pressure sensors 47A and 47B, and uses the acquired values for a control method for a work vehicle according to the present embodiment. The pressure sensor 48 is a lift pressure detecting device that detects lift pressure in the lift cylinder 7, i.e., pressure of operating oil in the lift cylinder 7. The temperature sensor 49 is a temperature detecting device that detects a temperature of operating oil in the HST.

The control device 30 includes a processing unit 30C and a storage unit 30M. For example, the control device 30 is a device including a computer to execute various processes involved with the control of the forklift 1. The processing unit 30C is a device including a CPU (Central Processing Unit) and a memory in combination with each other. The processing unit 30C reads a computer program that is stored in the storage unit 30M for controlling the main hydraulic circuit 100, and executes a command written on this program to control the operation of the main hydraulic circuit 100. The storage unit 30M stores the above-mentioned computer program and data necessary for the control of the main hydraulic circuit 100. The storage unit 30M is a ROM (Read Only Memory), a storage device, or a device including a ROM and a storage device in combination.

Various sensors, such as the inching potentiometer 40, the accelerator potentiometer 41, the forward/reverse lever switch 42, the engine rotation sensor 43, the speed sensor 46, and the pressure sensors 47A and 47B, are electrically connected to the control device 30. The control device 30 generates instruction signals for the forward pump solenoid proportional control valve 12 and the reverse pump solenoid proportional control valve 13 based on the input signals from these various sensors, and supplies the generated instruction signals to the respective solenoid proportional control valves 12, 13, and 22.

<Switchback Operation>

The control device 30 illustrated in FIG. 2 executes the control method for a work vehicle according to the present embodiment, when the forklift 1 executes a switchback operation. The switchback operation is an operation of the forklift 1 in the case where the actual advancing direction of the forklift 1 and the advancing direction specified by the advancing direction instruction value DR are different from each other. Examples of the switchback operation include an operation in which an operator, who depresses the accelerator pedal 41a illustrated in FIG. 1 and sets the forward/reverse lever 42a to the forward F to allow the forklift 1 to move in the forward direction, switches the forward/reverse lever 42a to the reverse R.

Figure 3:
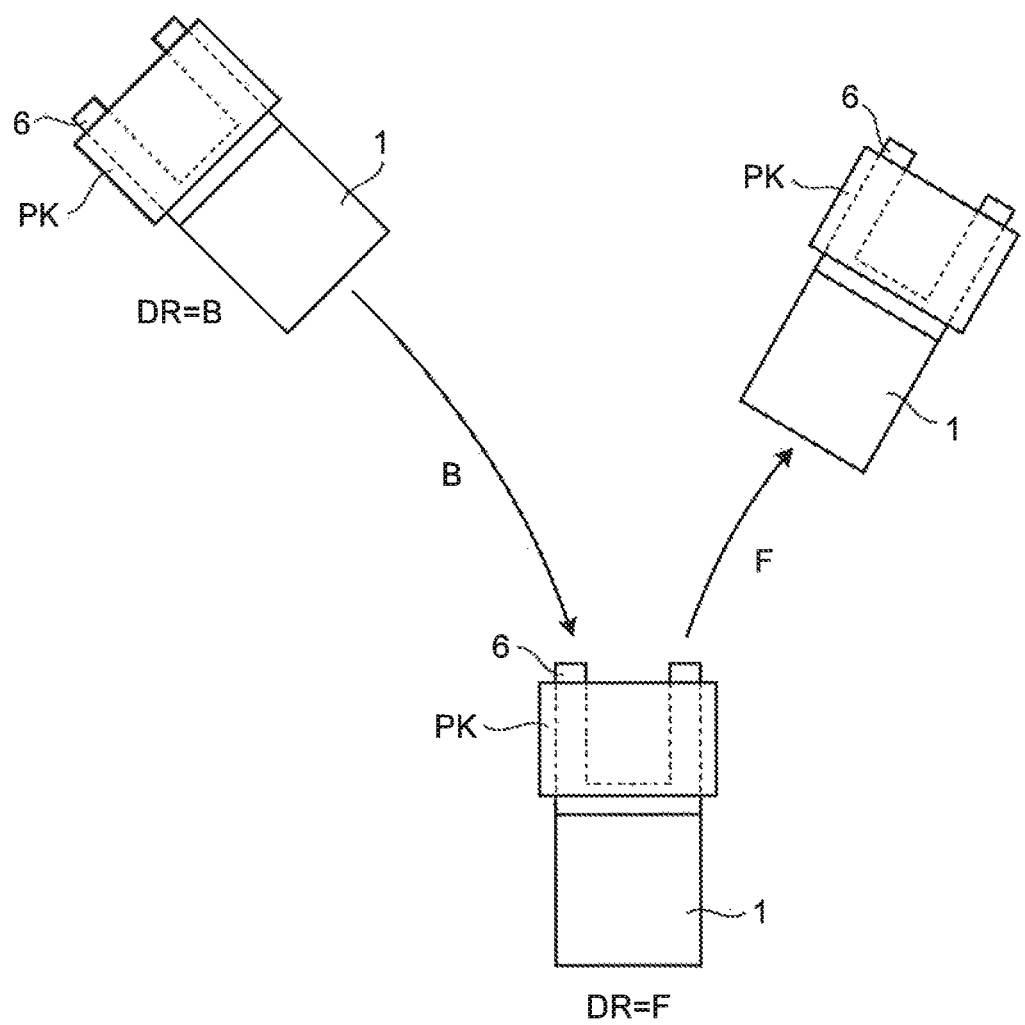
FIG. 3 is a diagram illustrating one example of a switchback operation.

FIG. 3 is a view illustrating one example of the switchback operation. For example, the operator switches the forward/reverse lever 42a from the reverse to the forward (advancing direction instruction value DR=F) at a certain timing during the reverse movement (advancing direction instruction value DR=B) of the forklift 1 carrying a cargo PK. With this operation, the forklift 1 starts to move forward. Such operation is one example of the switchback operation.

<Control Block of Control Device 30>

Figure 4:
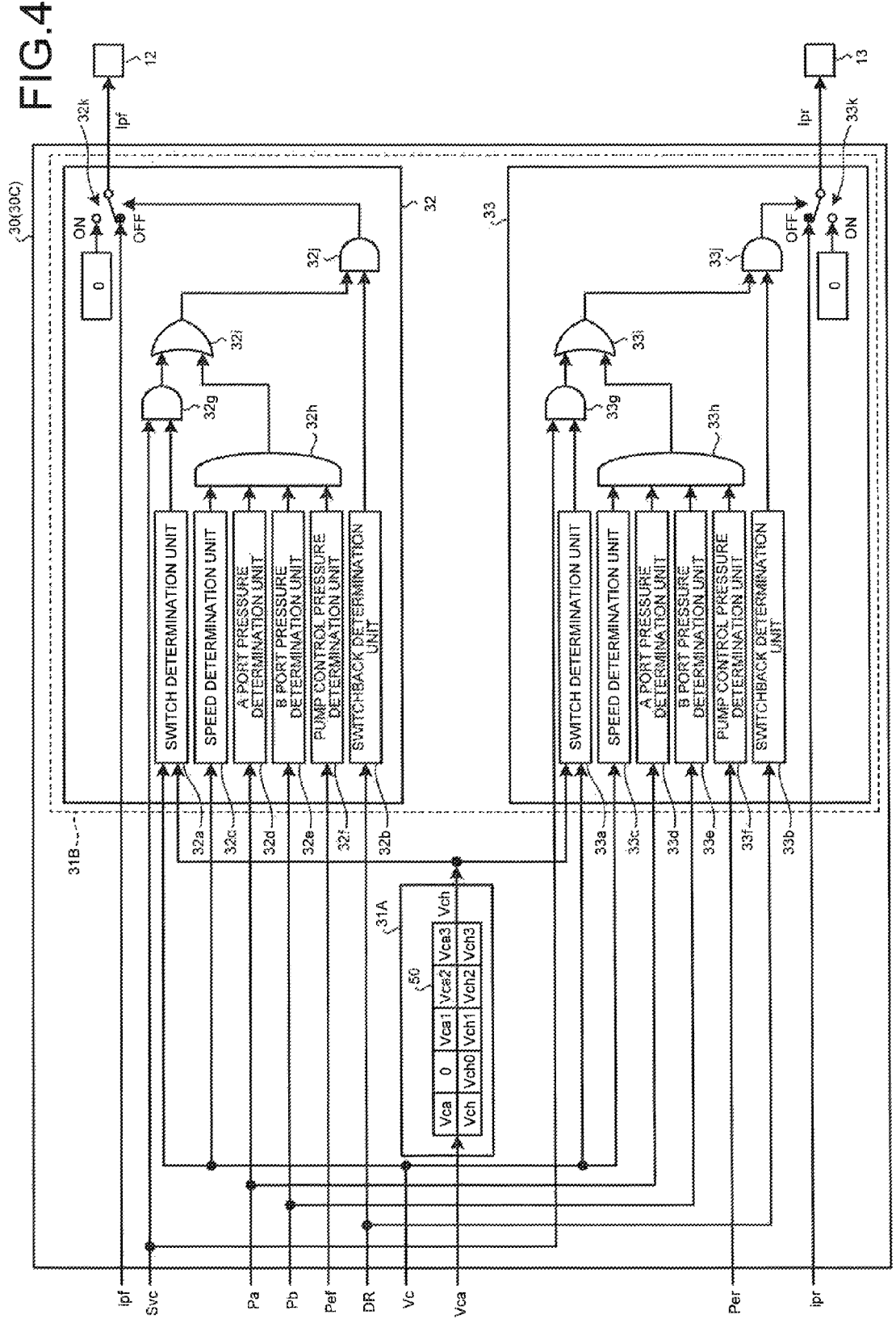
FIG. 4 is a control block diagram of a control device.
Figures 5, 6:
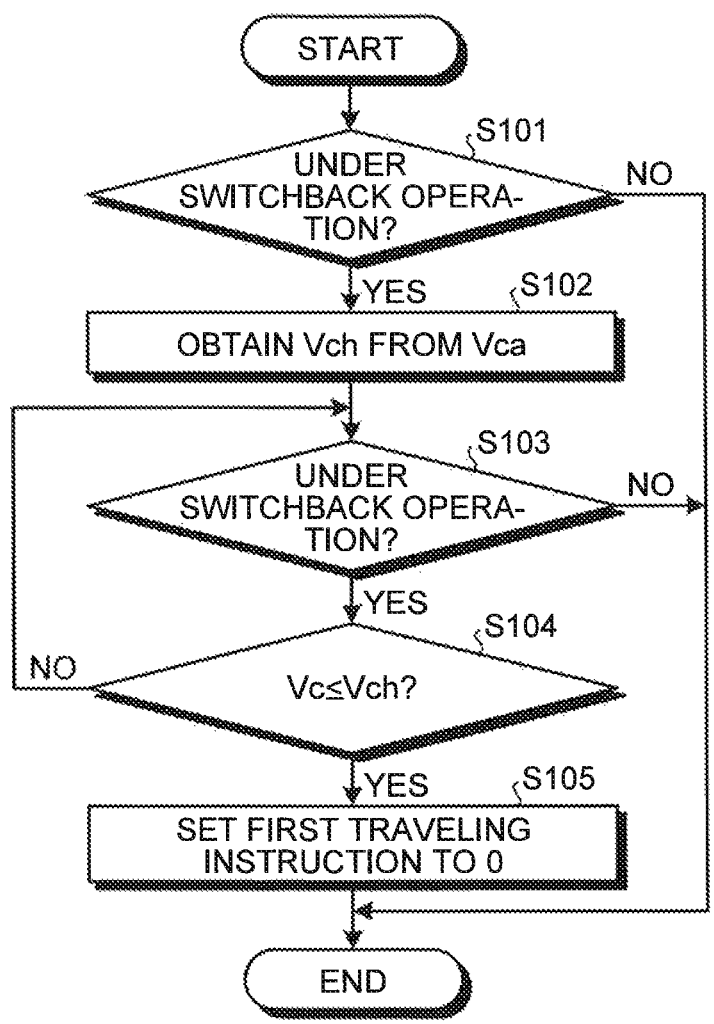
FIG. 5 is one example of a table on which a speed upon detecting inverting operation, which is information upon detecting inverting operation, and a determination speed that is determination information are written.
FIG. 6 is a flowchart illustrating an example of a process of a control method for a work vehicle according to the embodiment of the present invention.

FIG. 4 is a control block diagram of the control device 30. FIG. 5 is one example of a table 50 on which a relationship between a speed upon detecting inverting operation, which is information upon detecting inverting operation, and a determination speed that is determination information are written. The control device 30, more specifically, the processing unit 30C executes the control method for a work vehicle according to the present embodiment upon the switchback operation of the forklift 1. The processing unit 30C in the control device 30 includes a determination information calculating unit 31A and a traveling instruction calculating unit 31B.

When detecting the switchback operation during the travel of the forklift 1, the control device 30 obtains determination information from information upon detecting inverting operation, wherein the information upon detecting inverting operation indicates a traveling state when the switchback operation is detected. For example, the time when the inverting operation for the forward/reverse lever 42a for inverting the advancing direction of the forklift 1 is detected by the forward/reverse lever switch 42 can be a timing at which the switchback operation is detected. The determination information is acquired from the determination information calculating unit 31A.

Then, the control device 30, more specifically, the traveling instruction calculating unit 31B decreases a first traveling instruction, which is an instruction signal for allowing the forklift 1 to travel in the advancing direction of the forklift 1 at the point at which the switchback operation is detected, and increases a second traveling instruction that is an instruction signal for allowing the forklift 1 to travel in the direction opposite to the advancing direction of the forklift 1 at the point at which the switchback operation is detected, after the detection of the switchback operation. Thereafter, the control device 30 sets the first traveling instruction to 0 when the speed information indicating the traveling state of the forklift 1 becomes the determination information.

As described above, the determination information calculating unit 31A acquires determination information. The determination information is for determining a timing at which the first traveling instruction is set to 0 by the traveling instruction calculating unit 31B, and the determination information can be acquired from the information upon detecting inverting operation. In the present embodiment, the information upon detecting inverting operation is a speed Vca of the forklift 1 at the time at which the switchback operation of the forklift 1 is detected. In the description below, the information upon detecting inverting operation is referred to as a speed upon detecting inverting operation Vca, as necessary. In the present embodiment, the determination information is a speed Vch determined beforehand corresponding to the speed upon detecting inverting operation Vca. The speed Vch is referred to as a determination speed Vch below, as necessary.

In the present embodiment, the relationship between the speed upon detecting inverting operation Vca and the determination speed Vch is written on the table 50. The table 50 is stored in the storage unit 30M in the control device 30 illustrated in FIG. 2. When executing the control method for a work vehicle according to the present embodiment, the determination information calculating unit 31A reads the table 50 from the storage unit 30M, and acquires the determination speed Vch corresponding to the speed upon detecting inverting operation Vca acquired from the speed sensor 46 by referring to the read table 50.

As illustrated in FIG. 5, in the table 50, the information upon detecting inverting operation, i.e., the speed upon detecting inverting operation Vca increases from in the order of Vca1, Vca2, and Vca3. Specifically, the determination information, that is, the determination speed Vch increases in the order of Vch0, Vch1, Vch2, and Vch3, corresponding to the speed upon detecting inverting operation Vca. With this setting, the determination speed Vch can appropriately be changed according to the change in the speed upon detecting inverting operation Vca of the forklift 1. As a result, the control device 30 can invert the advancing direction of the forklift 1 at the timing at which an operator feels less sense of discomfort, even though the speed Vc of the forklift 1 upon the start of the switchback operation is different. In the present embodiment, the determination speed Vch is larger than the speed upon detecting inverting operation Vca=0, and smaller than the speed upon detecting inverting operation Vca1. The determination speed Vch may be specified by a calculation formula other than the table 50.

In the present embodiment, the information upon detecting inverting operation and the determination information are a speed as described above. However, they are not limited thereto. For example, absorption torque of the traveling hydraulic pump 10 illustrated in FIG. 2 may be used as the information upon detecting inverting operation and the determination information. In this case, an instruction value of the absorption torque generated by the control device 30 is used as the information upon detecting inverting operation. The determination information is torque determined depending on the information upon detecting inverting operation, and it is determined by an experiment or computer simulation. The larger the information upon detecting inverting operation becomes, the larger the determination information becomes, and this is similar to the case where a speed is used for the information upon detecting inverting operation and the determination information. The traveling instruction calculating unit 31B will next be described.

The traveling instruction calculating unit 31B controls the forward pump solenoid proportional control valve 12 and the reverse pump solenoid proportional control valve 13 in the pump capacity setting unit 11 illustrated in FIG. 2. With this control, the traveling instruction calculating unit 31B changes the tilt angle of the swash plate 10S of the traveling hydraulic pump 10, thereby changing the capacity of the traveling hydraulic pump 10 and switching the discharge side and the intake side of the operating oil. The tilt angle of the swash plate 10S of the traveling hydraulic pump 10, i.e., the operating amount of the operation mechanism of the traveling hydraulic pump 10, is determined by a traveling instruction and a load of the main hydraulic circuit 100 that is a closed circuit. This means that the swash plate 10S of the traveling hydraulic pump 10 is controlled without using a servo mechanism, in other words, that the traveling hydraulic pump 10 is a servoless pump.

When the forklift 1 starts the switchback operation, the traveling instruction calculating unit 31B firstly decreases the first traveling instruction, and increases the second traveling instruction. The traveling instruction calculating unit 31B then sets the first traveling instruction to 0 at the timing at which the speed Vc of the forklift 1 becomes the determination speed Vch. In the case where the information upon detecting inverting operation and the determination information are not a speed, for example, they are absorption torque of the traveling hydraulic pump 10, the traveling instruction calculating unit 31B sets the first traveling instruction to 0 at the timing at which the absorption torque of the traveling hydraulic pump 10 in the forklift 1 becomes the determination absorption torque acquired from the absorption torque upon detecting the inverting operation. In this case, it is set such that the determination absorption torque increases, as the absorption torque upon detecting the inverting operation increases.

The first traveling instruction is for allowing the forklift 1 to travel in a first advancing direction. The first advancing direction is the advancing direction of the forklift 1 at the point at which the traveling instruction calculating unit 31B in the control device 30 detects the switchback operation of the forklift 1. For example, when the forward/reverse lever 42a is switched to the reverse from the forward during the forward movement of the forklift 1, the first advancing direction is the direction in which the forklift 1 moves forward. In this case, the first traveling instruction is a traveling instruction for allowing the forklift 1 to move in the forward direction. When the forward/reverse lever 42a is switched to the forward from the reverse during the reverse movement of the forklift 1, the first advancing direction is the direction in which the forklift 1 moves in the reverse direction. In this case, the first traveling instruction is a traveling instruction for allowing the forklift 1 to move in the reverse direction. As described above, the first traveling instruction is different depending on the advancing direction of the forklift 1 at the point at which the forklift 1 starts the switchback operation.

The second traveling instruction is an instruction for allowing the forklift 1 to travel in a second advancing direction. The second advancing direction is opposite to the first advancing direction. For example, when the forward/reverse lever 42*a* is switched to the reverse from the forward during the forward movement of the forklift 1, the direction opposite to the advancing direction upon detecting the switchback operation is the direction in which the forklift 1 moves in the reverse direction. In this case, the second traveling instruction is a traveling instruction for allowing the forklift 1 to move in the reverse direction. When the forward/reverse lever 42*a* is switched to the forward from the reverse during the reverse movement of the forklift 1, the direction opposite to the advancing direction upon detecting the switchback operation is the direction in which the forklift 1 moves in the forward direction. In this case, the second traveling instruction is a traveling instruction for allowing the forklift 1 to move in the forward direction. As described above, the second traveling instruction is different depending on the advancing direction of the forklift 1 at the point at which the forklift 1 starts the switchback operation.

When executing the control method for a work vehicle according to the present embodiment, the traveling instruction calculating unit 31B can reduce a time lag from the time at which the inverting operation of the forward/reverse lever 42*a* is performed till the time at which the advancing direction of the forklift 1 is inverted during the switchback operation of the forklift 1 traveling with high speed. During the switchback operation of the forklift 1 traveling with low speed, shock upon inverting the advancing direction of the forklift 1 is reduced, whereby the forklift 1 can smoothly change the advancing direction. Next, the traveling instruction calculating unit 31B will be described in more detail.

As illustrated in FIG. 4, the traveling instruction calculating unit 31B includes a forward traveling instruction calculating unit 32 and a reverse traveling instruction calculating unit 33. The forward traveling instruction calculating unit 32 controls the forward pump solenoid proportional control valve 12 in the pump capacity setting unit 11. The reverse traveling instruction calculating unit 33 controls the reverse pump solenoid proportional control valve 13 in the pump capacity setting unit 11.

The control device 30 generates at least one of a traveling instruction ipf supplied to the forward pump solenoid proportional control valve 12 and a traveling instruction ipr supplied to the reverse pump solenoid proportional control valve 13 from an operation amount of the accelerator pedal 41*a* illustrated in FIG. 2, for example. In the present embodiment, the traveling instruction ipf and the traveling instruction ipr are current. However, they are not limited thereto, and may be a voltage or other factors.

The forward traveling instruction calculating unit 32 outputs the traveling instruction (hereinafter referred to as a forward traveling instruction, as necessary) Ipf for allowing the forklift 1 to travel in the forward direction to the forward pump solenoid proportional control valve 12. The reverse traveling instruction calculating unit 33 outputs the traveling instruction (hereinafter referred to as a reverse traveling instruction, as necessary) Ipr for allowing the forklift 1 to travel in the reverse direction to the reverse pump solenoid proportional control valve 13. The forward traveling instruction Ipf is the same as the traveling instruction ipf generated by the control device 30, and the reverse traveling instruction Ipr is the same as the traveling instruction ipr generated by the control device 30, except for the case in which the traveling instruction calculating unit 31B sets the first traveling instruction to 0 during the switchback operation of the forklift 1.

When the forklift 1 travels in the forward direction, the control device 30 generates the traveling instruction ipf that is to be supplied to the forward pump solenoid proportional control valve 12 from the operation amount, for example, of the accelerator pedal 41*a*, and sets the traveling instruction ipr that is to be supplied to the reverse pump solenoid proportional control valve 13 to 0. Therefore, the forward traveling instruction calculating unit 32 outputs the traveling instruction ipf to the forward pump solenoid proportional control valve 12 as the forward traveling instruction Ipf, and the reverse traveling instruction calculating unit 33 outputs the reverse traveling instruction Ipr=0 to the reverse pump solenoid proportional control valve 13.

When the forklift 1 travels in the reverse direction, the control device 30 generates the traveling instruction ipr that is to be supplied to the reverse pump solenoid proportional control valve 13 from the operation amount, for example, of the accelerator pedal 41*a*, and sets the traveling instruction ipf that is to be supplied to the forward pump solenoid proportional control valve 12 to 0. Therefore, the forward traveling instruction calculating unit 32 outputs the forward traveling instruction Ipf=0 to the forward pump solenoid proportional control valve 12, and the reverse traveling instruction calculating unit 33 outputs the traveling instruction ipr to the reverse pump solenoid proportional control valve 13 as the reverse traveling instruction Ipr.

The forward pump solenoid proportional control valve 12 generates hydraulic pressure of operating oil according to the magnitude of the current of the forward traveling instruction Ipf, i.e., generates a pump control pressure, to operate the pump capacity control cylinder 14. The reverse pump solenoid proportional control valve 13 generates hydraulic pressure of operating oil according to the magnitude of the current of the reverse traveling instruction Ipr, i.e., generates a pump control pressure, to operate the pump capacity control cylinder 14. The tilt angle of the swash plate 10S of the traveling hydraulic pump 10 is changed by the operation of the pump capacity control cylinder 14, whereby the traveling hydraulic pump 10 discharges operating oil to the hydraulic motor 20 with a flow rate according to at least one of the forward traveling instruction Ipf and the reverse traveling instruction Ipr.

When the forklift 1 starts the switchback operation while traveling in the forward direction, the control device 30 decreases the traveling instruction ipf supplied to the forward pump solenoid proportional control valve 12 with time, and increases the traveling instruction ipr supplied to the reverse pump solenoid proportional control valve 13 with time. When the forklift 1 starts the switchback operation while traveling in the reverse direction, the control device 30 decreases the traveling instruction ipr supplied to the reverse pump solenoid proportional control valve 13 with time, and increases the traveling instruction ipf supplied to the forward pump solenoid proportional control valve 12 with time.

The forward traveling instruction calculating unit 32 includes, as processing elements, a switch determination unit 32*a*, a switchback determination unit 32*b*, a speed determination unit 32*c*, an A port pressure determination unit 32*d*, a B port pressure determination unit 32*e*, a pump control pressure determination unit 32*f*, a first AND calculating unit 32*g*, a second AND calculating unit 32*h*, an OR calculating unit 32*i*, a third AND calculating unit 32*j*, and an output selection unit 32k. The reverse traveling instruction calculating unit 33 includes, as processing elements, a switch determination unit 33a, a switchback determination unit 33b, a speed determination unit 33c, an A port pressure determination unit 33d, a B port pressure determination unit 33e, a pump control pressure determination unit 33f, a first AND calculating unit 33g, a second AND calculating unit 33h, an OR calculating unit 33i, a third AND calculating unit 33j, and an output selection unit 33k. The processing elements in the forward traveling instruction calculating unit 32 and the reverse traveling instruction calculating unit 33 may be realized by software or hardware. Some of the processing elements in the forward traveling instruction calculating unit 32 have the same function as those in the reverse traveling instruction calculating unit 33. Therefore, these processing elements having the same function will be collectively described.

The switch determination units 32a and 33a determine whether the speed Vc of the forklift 1 after the detection of the switchback operation becomes not more than the determination speed Vch or not. When the speed Vc of the forklift 1 is higher than the determination speed Vch, the switch determination units 32a and 33a output an OFF signal. When the speed Vc of the forklift 1 becomes not more than the determination speed Vch, the switch determination units 32a and 33a output an ON signal. The OFF signal is, for example, a signal with a voltage of 0 volt, and the ON signal is a signal with a voltage of 5 volts.

The switchback determination units 32b and 33b output the OFF signal, when they do not detect the switchback operation of the forklift 1. On the other hand, the switchback determination units 32b and 33b output the ON signal, when they detect the switchback operation of the forklift 1. As described above, it can be determined that the switchback operation of the forklift 1 is detected when the inverting operation of the forward/reverse lever 42a is detected by the forward/reverse lever switch 42 during the travel of the forklift 1.

The advancing direction instruction value DR from the forward/reverse lever switch 42 illustrated in FIG. 2 is inputted to the switchback determination units 32b and 33b. When the advancing direction instruction value DR from the forward/reverse lever switch 42 is switched to R from F in the case where the traveling instruction ipf supplied to the forward pump solenoid proportional control valve 12 is generated in the control device 30, the switchback determination unit 32b in the forward traveling instruction calculating unit 32 determines that the switchback operation of the forklift 1 is detected, and outputs the ON signal. In other cases, the switchback determination unit 32b in the forward traveling instruction calculating unit 32 outputs the OFF signal.

When the advancing direction instruction value DR from the forward/reverse lever switch 42 is switched to F from R in the case where the traveling instruction ipr supplied to the reverse pump solenoid proportional control valve 13 is generated in the control device 30, the switchback determination unit 33b in the reverse traveling instruction calculating unit 33 determines that the switchback operation of the forklift 1 is detected, and outputs the ON signal. In other cases, the switchback determination unit 33b in the reverse traveling instruction calculating unit 33 outputs the OFF signal.

The speed determination units 32c and 33c, the A port pressure determination units 32d and 33d, the B port pressure determination units 32e and 33e, and the pump control pressure determination units 32f and 33f are used to control the operation upon the switchback of the forklift 1, when something abnormal occurs on the speed sensor 46 illustrated in FIG. 2. The speed determination units 32c and 33c determine whether or not the speed Vc of the forklift 1 detected by the speed sensor 46 is equal to or less than a predetermined threshold value. When the speed Vc is larger than the predetermined threshold value, the speed determination units 32c and 33c output an OFF signal. When the speed Vc is equal to or less than the predetermined threshold value, the speed determination units 32c and 33c output an ON signal.

When something abnormal occurs on the speed sensor 46, the speed sensor 46 outputs the speed Vc of 0. Therefore, the above threshold value can be a value by which the abnormality of the speed sensor 46 can be detected. For example, the predetermined threshold value can be 0.1 km/h, for example. However, the value is not limited thereto.

The A port pressure determination units 32d and 33d determine whether or not the pressure (hereinafter referred to as an A port pressure, as necessary) Pa of the operating oil in the A port 10A of the traveling hydraulic pump 10 illustrated in FIG. 2 is equal to or less than a predetermined threshold value. The A port pressure Pa is detected by the pressure sensor 47A. When the A port pressure Pa is larger than the predetermined threshold value, the A port pressure determination units 32d and 33d output an OFF signal. When the A port pressure Pa is equal to or less than the predetermined threshold value, the A port pressure determination units 32d and 33d output an ON signal.

The B port pressure determination units 32e and 33e determine whether or not the pressure (hereinafter referred to as a B port pressure, as necessary) Pb of the operating oil in the B port 10B of the traveling hydraulic pump 10 illustrated in FIG. 2 is equal to or less than a predetermined threshold value. The B port pressure Pb is detected by the pressure sensor 47B. When the B port pressure Pb is larger than the predetermined threshold value, the B port pressure determination units 32e and 33e output an OFF signal. When the B port pressure Pb is equal to or less than the predetermined threshold value, the B port pressure determination units 32e and 33e output an ON signal.

When the A port pressure Pa and the B port pressure Pb both decrease during the switchback operation of the forklift 1, the state in which the first traveling instruction is not 0 is continued, resulting in that the state in which the advancing direction of the forklift 1 is not switched might be continued. Therefore, when the A port pressure Pa and the B port pressure Pb become equal to or less than the predetermined threshold value, the A port pressure determination units 32d and 33d and the B port pressure determination units 32e and 33e output the ON signal to quickly switch the advancing direction of the forklift 1.

The pump control pressure determination unit 32f in the forward traveling instruction calculating unit 32 determines whether or not the pump control pressure (hereinafter referred to as a forward-side control pressure, as necessary) Pef from the forward pump solenoid proportional control valve 12 is equal to or less than a predetermined threshold value. The forward-side control pressure Pef is detected by a first pressure sensor 12s illustrated in FIG. 2. When the forward-side control pressure Pef is larger than the predetermined threshold value, the pump control pressure determination unit 32f outputs an OFF signal. When the forward-side control pressure Pef is equal to or less than the predetermined threshold value, the pump control pressure determination unit 32f outputs an ON signal.

The pump control pressure determination unit 33f in the reverse traveling instruction calculating unit 33 determines whether or not the pump control pressure (hereinafter referred to as a reverse-side control pressure, as necessary) Per from the reverse pump solenoid proportional control valve 13 is equal to or less than a predetermined threshold value. The reverse-side control pressure Per is detected by a second pressure sensor 13s illustrated in FIG. 2. When the reverse-side control pressure Per is larger than the predetermined threshold value, the pump control pressure determination unit 32f outputs an OFF signal. When the reverse-side control pressure Per is equal to or less than the predetermined threshold value, the pump control pressure determination unit 33f outputs an ON signal.

The A port pressure Pa and the B port pressure Pb both may be decreased when the speed Vc is high at the timing at which the switchback operation of the forklift 1 is detected. Therefore, when the first traveling instruction is set to 0 by using the determination results of the A port pressure determination units 32d and 33d and the B port pressure determination units 32e and 33e in the case where abnormality occurs on the speed sensor 46, shock might be generated. In view of this, the determination of the pump control pressure determination units 32f and 33f are also used to set the first traveling instruction to 0 after the speed Vc of the forklift 1 becomes sufficiently low. The predetermined threshold value can be a forward-side control pressure Pef or the reverse-side control pressure Per when the forklift 1 travels with a speed of nearly 0 (in the present embodiment, 0.6 km/h, but not limited thereto) with no load. According to the determinations by the pump control pressure determination units 32f and 33f, shock generated on the forklift 1 can be reduced during the switchback operation with the speed sensor 46 having abnormality.

A speed monitoring flag Svc and outputs from the switch determination units 32a and 32b are inputted to the first AND calculating units 32g and 33g. The speed monitoring flag Svc is an ON signal when the speed sensor 46 is normal, while it is an OFF signal when the speed sensor 46 has some abnormality. Therefore, the first AND calculating units 32g and 33g output the ON signal only when the speed sensor 46 is normal and the speed Vc becomes equal to or less than the determination speed Vch. The first AND calculating units 32g and 33g output the OFF signal, when the speed Vc is higher than the determination speed Vch even if the speed sensor 46 is normal, or when the speed sensor 46 is abnormal. When the speed sensor 46 is normal, the first AND calculating units 32g and 33g can detect whether a condition for setting the first traveling instruction to 0 is established or not.

The second AND calculating units 32h and 33h receive an output from the speed determination unit 32c, an output from the A port pressure determination unit 32d, an output from the B port pressure determination unit 32e, and an output from the pump control pressure determination unit 32f. The second AND calculating units 32h and 33h output an ON signal only when these outputs are all ON signals. On the other hand, when at least one of these outputs is an OFF signal, the second AND calculating units 32h and 33h output an OFF signal. When abnormality occurs on the speed sensor 46, the second AND calculating units 32h and 33h can detect whether the condition for setting the first traveling instruction to 0 is established or not.

The OR calculating units 32i and 33i receive outputs from the first AND calculating units 32g and 33g, and outputs from the second AND calculating units 32h and 33h. The OR calculating units 32i and 33i output an ON signal when at least one of the outputs from the first AND calculating units 32g and 33g and the outputs from the second AND calculating units 32h and 33h are an ON signal. On the other hand, when both of these outputs are an OFF signal, the OR calculating units 32i and 33i output an OFF signal. Whenever the speed sensor 46 is normal or abnormal, the OR calculating units 32i and 33i can determine whether the condition for setting the first traveling instruction to 0 is established or not.

The third AND calculating units 32j and 33j receive outputs from the OR calculating units 32i and 33i and an output from the switchback determination unit 32b. The third AND calculating units 32j and 33j output an ON signal only when the output from the switchback determination unit 32b is an ON signal and the outputs from the OR calculating units 32i and 33i are an ON signal. In other cases, the third AND calculating units 32j and 33j output an OFF signal. Specifically, the OR calculating unit 32i outputs an ON signal, only when the outputs from the OR calculating units 32i and 33i become an ON signal and when the output from the switchback determination unit 32b is an ON signal, which means the switchback operation is detected. With this process, the third AND calculating units 32j and 33j can determine whether the condition for setting the first traveling instruction to 0 is established or not during the switchback operation.

The output selection unit 32k in the forward traveling instruction calculating unit 32 selects one of 0 or the traveling instruction ipf generated by the control device 30, and outputs the selected one to the forward pump solenoid proportional control valve 12 as the forward traveling instruction Ipf. Specifically, when the output from the third AND calculating unit 32j in the forward traveling instruction calculating unit 32 is an OFF signal, the output selection unit 32k selects the traveling instruction ipf generated by the control device 30, and outputs the selected traveling instruction ipf as the forward traveling instruction Ipf. When the output from the third AND calculating unit 32j is an ON signal, i.e., when the condition for setting the first traveling instruction to 0 is established during the switchback operation, the output selection unit 32k selects 0, and outputs 0 as the forward traveling instruction Ipf.

The output selection unit 33k in the reverse traveling instruction calculating unit 33 selects one of 0 or the traveling instruction ipr generated by the control device 30, and outputs the selected one to the reverse pump solenoid proportional control valve 13 as the reverse traveling instruction Ipr. Specifically, when the output from the third AND calculating unit 33j in the reverse traveling instruction calculating unit 33 is an OFF signal, the output selection unit 33k selects the traveling instruction ipr generated by the control device 30, and outputs the selected traveling instruction ipr as the reverse traveling instruction Ipr. When the output from the third AND calculating unit 33j is an ON signal, i.e., when the condition for setting the first traveling instruction to 0 is established during the switchback operation, the output selection unit 33k selects 0, and outputs 0 as the reverse traveling instruction ipr.

<Example of Process>

FIG. 6 is a flowchart illustrating an example of a process of the control method for a work vehicle according to the present embodiment. Upon executing the control method for a work vehicle according to the present embodiment, the switchback determination units 32b and 33b in the control device 30 determine whether the forklift 1 is under the switchback operation or not in step S101. The switchback determination units 32b and 33b determine that the forklift 1 is under the switchback operation, when the advancing direction of the forklift 1 according to the advancing direction instruction value DR and the advancing direction determined by the traveling instruction ipf or the traveling instruction ipr are different from each other. The switchback determination units 32b and 33b determine that the forklift 1 is not under the switchback operation, when the advancing direction of the forklift 1 according to the advancing direction instruction value DR and the advancing direction determined by the traveling instruction ipf or the traveling instruction ipr are the same.

When the forklift 1 is not under the switchback operation (step S101, No), the control method for a work vehicle according to the present embodiment is ended. When the forklift 1 is under the switchback operation (step S101, Yes), the control device 30 decreases the first traveling instruction, and increases the second traveling instruction. In step S102, the determination information calculating unit 31A in the control device 30 acquires the speed Vc of the forklift 1 at the timing at which the forklift 1 is determined to be under the switchback operation from the speed sensor 46. This speed Vc is the speed upon detecting inverting operation Vca. The determination information calculating unit 31A obtains the determination speed Vch corresponding to the speed upon detecting inverting operation Vca by referring to the table 50 illustrated in FIG. 5.

Then, in step S103, the switchback determination units 32b and 33b determine whether the forklift 1 is under the switchback operation or not. When the forklift 1 is not under the switchback operation (step S103, No), the control method for a work vehicle according to the present embodiment is ended. In this case, the control device 30 generates the traveling instruction ipf or the traveling instruction ipr from the operation amount of the accelerator pedal 41a at present to control the forward pump solenoid proportional control valve 12 or the reverse pump solenoid proportional control valve 13.

When the forklift 1 is under the switchback operation (step S103, Yes), the control device 30 proceeds to step S104. In step S104, the switch determination unit 32a in the forward traveling instruction calculating unit or the switch determination unit 33a in the reverse traveling instruction calculating unit 33 determines whether or not speed information indicating the traveling state of the forklift 1, i.e., the speed Vc acquired from the speed sensor 46 in the present embodiment, is not more than the determination speed Vch.

When the speed Vc is higher than the determination speed Vch (step S104, No), the control device returns to step S103. When the speed Vc is not more than the determination speed Vch (step S104, Yes), the control device 30 sets the first traveling instruction to 0 in step S105. For example, the forward traveling instruction calculating unit 32 sets the forward traveling instruction Ipf to 0 during the switchback operation in which the forklift 1 travels in the forward direction. Alternatively, the reverse traveling instruction calculating unit 33 sets the forward traveling instruction Ipr to 0 during the switchback operation in which the forklift 1 travels in the reverse direction.

Figure 7:
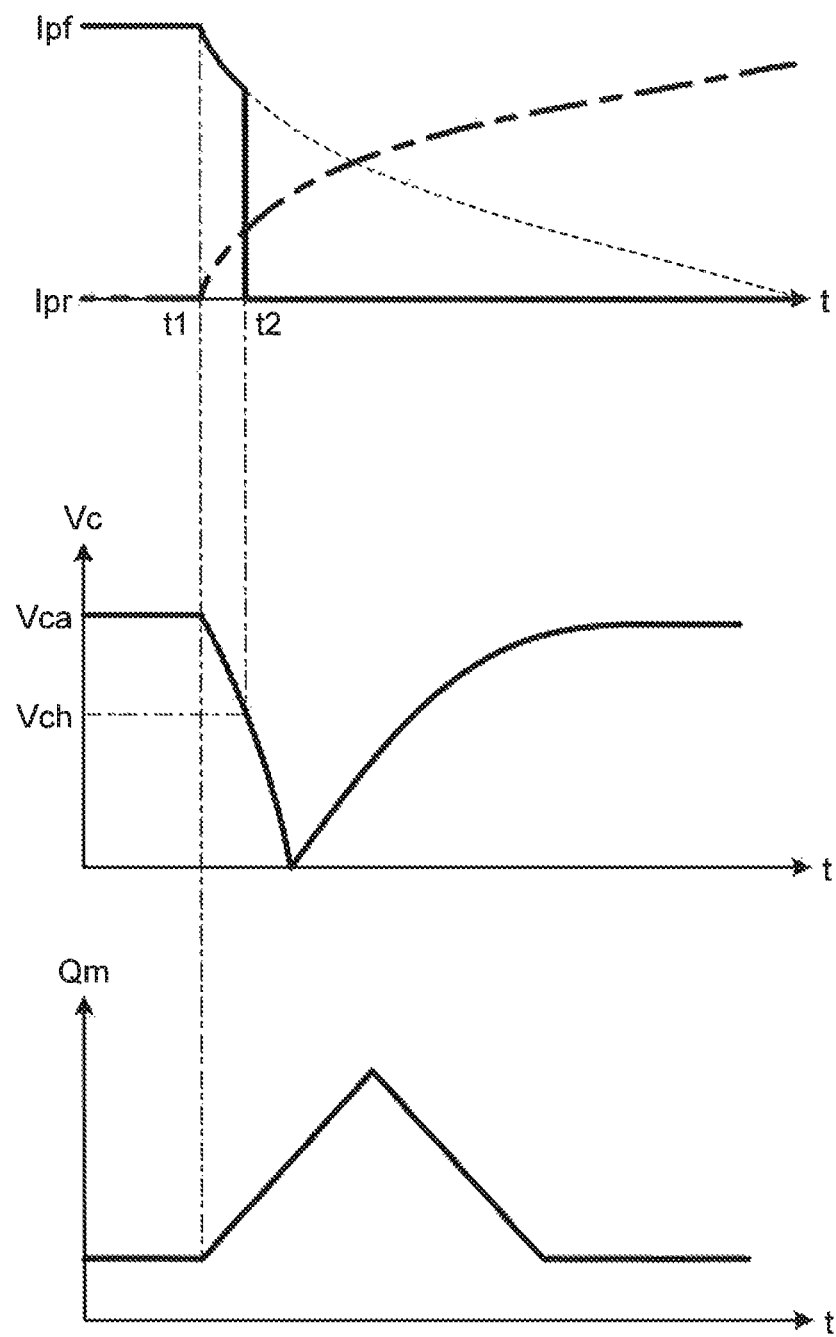
FIG. 7 is a timing chart in the control method for a work vehicle according to the embodiment of the present invention.
Figure 8:
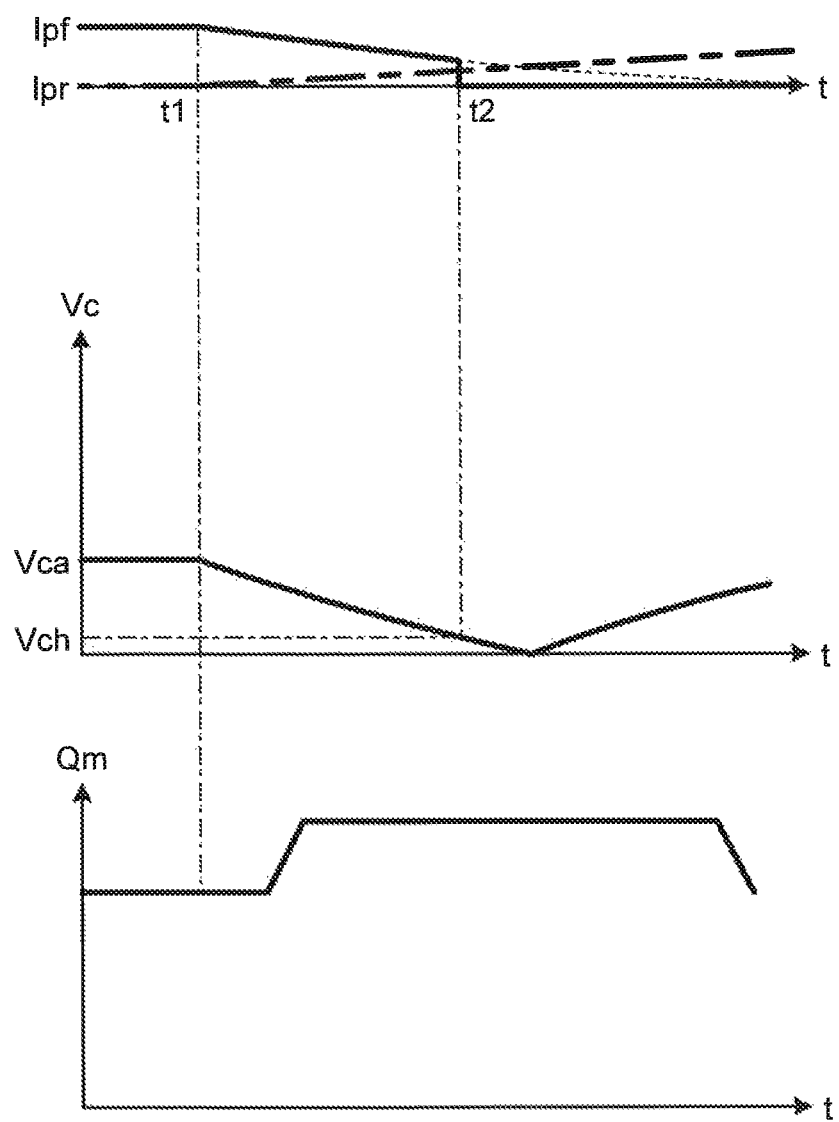
FIG. 8 is a timing chart in the control method for a work vehicle according to the embodiment of the present invention.

FIGS. 7 and 8 are timing charts of the control method for a work vehicle according to the present embodiment. FIG. 7 illustrates the case in which the forklift 1 starts the switchback operation while traveling with high speed, and FIG. 8 illustrates the case in which the forklift 1 starts the switchback operation while traveling with low speed. FIGS. 7 and 8 illustrate examples in which the forklift 1 travels in the forward direction.

At a time t=t1 in FIGS. 7 and 8, the switchback operation of the forklift 1 is detected. As described above, the forward traveling instruction Ipf that is the first traveling instruction decreases, while the reverse traveling instruction Ipr that is the second traveling instruction increases. The speed of the forklift 1 at the time t=t1 is the speed upon detecting inverting operation Vca. The determination speed Vch is lower than the speed upon detecting inverting operation Vca. Qm is the capacity of the hydraulic motor 20 illustrated in FIG. 2.

An instruction (hereinafter referred to as a hydraulic motor control instruction as necessary) for changing the capacity Qm of the hydraulic motor 20 is determined with an integral control from the pressure of the operating oil in the main hydraulic circuit 100 and the instruction signal for the traveling hydraulic pump 10, specifically, the forward traveling instruction Ipf or the reverse traveling instruction Ipr. The hydraulic motor control instruction is determined such that the capacity Qm of the hydraulic motor 20 is decreased to increase the speed Vc, when the instruction signal for the traveling hydraulic pump 10 is large, i.e., when the operator allows the forklift 1 to travel with high speed. On the other hand, when the instruction signal for the traveling hydraulic pump 10 is large, i.e., when the operator allows the forklift 1 to travel with low speed, the hydraulic motor control instruction is determined such that the capacity Qm of the hydraulic motor 20 is increased to increase torque.

At a time t=t2, the speed Vc of the forklift 1 is not more than the determination speed Vch. Therefore, the forward traveling instruction calculating unit 32 in the control device 30 sets the forward traveling instruction Ipf, which is the first traveling instruction in this case, to 0, and continuously increases the reverse traveling instruction Ipr, which is the second traveling instruction in this case. When the forklift 1 traveling with high speed starts the switchback operation as illustrated by an upper chart in FIG. 7, an acceleration, i.e., a slope of the speed Vc to the time t increases as illustrated by a middle chart in FIG. 7, so that the forward traveling instruction Ipf that is the first traveling instruction can be set to 0 at relatively early timing. This process can prevent the time lag from the time at which the forward/reverse lever 42a is operated till the forklift 1 is inverted, whereby quick traveling can be realized.

When the forklift 1 traveling with low speed starts the switchback operation as illustrated by an upper chart in FIG. 8, an acceleration is decreased as illustrated by a middle chart in FIG. 8, so that the forward traveling instruction Ipf that is the first traveling instruction can be set to 0 at a relatively late timing. This process can prevent the shock generated from the time at which the forward/reverse lever 42a is operated till the forklift 1 is inverted. When the forklift 1 traveling with low speed starts the switchback operation, the capacity of the traveling hydraulic pump 10 is small due to the lower speed Vc, so that the capacity Qm of the hydraulic motor 20 increases as illustrated in a lower chart in FIG. 8. In this example, the capacity Qm of the hydraulic motor 20 becomes the maximum during the switchback operation.

The process of setting the first traveling instruction to 0 at the timing at which the speed Vc of the forklift 1 becomes not more than the determination speed Vch as described above can prevent the time lag till the traveling direction is inverted during the switchback operation with high speed, and this process can also reduce shock during the switchback operation with low speed. When the forklift 1 performs the switchback operation with low speed, the forklift 1 is often demanded to perform precision motion. The control device 30 sets the first traveling instruction to 0 at the timing at which the speed Vc of the forklift 1 becomes not more than the determination speed Vch. However, since the acceleration is relatively small when the forklift 1 travels with low speed, the timing at which the first traveling instruction becomes 0 can be relatively delayed. Consequently, the control device 30 can effectively reduce shock during the switchback operation with low speed, whereby it is advantageously easy for the operator to allow the forklift 1 to perform precision motion.

In the present embodiment, the traveling hydraulic pump 10 is a servoless pump. However, in the servoless pump, the swash plate 10S might move unintentionally against a drive instruction due to a load in the main hydraulic circuit 100. Therefore, the capacity of the servoless pump might be changed at an unintentional timing. The traveling hydraulic pump 10 has to operate against the pressure of the operating oil in the main hydraulic circuit 100 in order to invert the advancing direction of the forklift 1 during the switchback operation. When the servoless pump is used as the traveling hydraulic pump 10, the time lag increases unless the discharge side and the intake side of the traveling hydraulic pump 10 are quickly and greatly changed when the forklift 1 stops for the switchback operation. The control device 30 according to the present embodiment sets the first traveling instruction to 0 at the timing at which the speed Vc of the forklift 1 becomes not more than the determination speed Vch as described above, thereby being capable of reducing the time lag even if the servoless pump is used for the traveling hydraulic pump 10.

In the present embodiment, the information upon detecting inverting operation and the determination information are a speed. Since the speed of the forklift 1 has high correlation with the tilt angle of the swash plate 10S in the traveling hydraulic pump 10, the tilt angle of the swash plate 10S of the traveling hydraulic pump 10 can precisely be estimated by the speed of the forklift 1. With this, when the speed of the forklift 1 is used as the information upon detecting inverting operation and the determination information, the swash plate 10S of the traveling hydraulic pump 10 that is the subject to be controlled can precisely be controlled, whereby the first traveling instruction can be set to 0 at an appropriate timing.

While the present embodiment has been described above, the present embodiment is not limited to the above description. The components described above include those easily considered by a person skilled in the art, those substantially the same, and their equivalents. The above components can appropriately be combined. Furthermore, at least one of omissions, substitutions, and modifications may be made without departing from the spirit of the present embodiment. The work vehicle may be a wheel loader, for example, so long as a work vehicle has wheels, and the work vehicle is not limited to the forklift 1.

REFERENCE SIGNS LIST

1 FORKLIFT
2a DRIVE WHEEL
3 BODY
4 ENGINE
6 FORK
10 TRAVELING HYDRAULIC PUMP
10A A PORT
10B B PORT
10S SWASH PLATE
10a, 10b HYDRAULIC SUPPLY CONDUIT
11 PUMP CAPACITY SETTING UNIT
12 FORWARD PUMP SOLENOID PROPORTIONAL CONTROL VALVE
13 REVERSE PUMP SOLENOID PROPORTIONAL CONTROL VALVE
14 PUMP CAPACITY CONTROL CYLINDER
14A PISTON
20 HYDRAULIC MOTOR
20S SWASH PLATE
21 MOTOR CAPACITY SETTING UNIT
30 CONTROL DEVICE
30C PROCESSING UNIT
30M STORAGE UNIT
31A DETERMINATION INFORMATION CALCULATING UNIT
31B TRAVELING INSTRUCTION CALCULATING UNIT
32 FORWARD TRAVELING INSTRUCTION CALCULATING UNIT
33 REVERSE TRAVELING INSTRUCTION CALCULATING UNIT
32a, 33a SWITCH DETERMINATION UNIT
32b, 33b SWITCHBACK DETERMINATION UNIT
32c, 33c SPEED DETERMINATION UNIT
32d, 33d A PORT PRESSURE DETERMINATION UNIT
32e, 33e B PORT PRESSURE DETERMINATION UNIT
32f, 33f PUMP CONTROL PRESSURE DETERMINATION UNIT
32g, 33g FIRST AND CALCULATING UNIT
32h, 33h SECOND AND CALCULATING UNIT
32i, 33i OR CALCULATING UNIT
32j, 33j THIRD AND CALCULATING UNIT
32k, 33k OUTPUT SELECTION UNIT
42 FORWARD/REVERSE LEVER SWITCH
42a FORWARD/REVERSE LEVER
46 SPEED SENSOR
47A, 47B, 48 PRESSURE SENSOR
49 TEMPERATURE SENSOR
50 TABLE
100 MAIN HYDRAULIC CIRCUIT
DR ADVANCING DIRECTION INSTRUCTION VALUE
Ipf FORWARD TRAVELING INSTRUCTION
Ipr REVERSE TRAVELING INSTRUCTION
ipf, ipr TRAVELING INSTRUCTION
Pa A PORT PRESSURE
Pb B PORT PRESSURE
Pef FORWARD-SIDE CONTROL PRESSURE
Per REVERSE-SIDE CONTROL PRESSURE
Vca SPEED UPON DETECTING INVERTING OPERATION
Vch DETERMINATION SPEED

The invention claimed is:

1. A work vehicle including a work machine, the work vehicle comprising:
a hydraulic motor that drives a drive wheel for moving the work vehicle;
a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil;
an advancing direction detection device that detects a state of an advancing direction switching device for switching a forward movement and a reverse movement of the work vehicle; and a control device that supplies a traveling instruction for allowing the work vehicle to travel to a drive device of the operation mechanism to operate the operation mechanism in order to discharge the operating oil from the traveling hydraulic pump, wherein an operation amount of the operation mechanism is determined by the traveling instruction and a load of the closed circuit, and the control device obtains determination information from information upon detecting inverting operation, the information upon detecting inverting operation indicating a traveling state of the work vehicle when the advancing direction detection device detects an inverting operation of the advancing direction switching device for inverting the advancing direction of the work vehicle while the work vehicle travels, the control device decreases a first traveling instruction for allowing the work vehicle to travel in the advancing direction of the work vehicle upon the detection of the inverting operation, and increases a second traveling instruction for allowing the work vehicle to travel in the direction opposite to the advancing direction of the work vehicle upon the detection of the inverting operation, after detecting the inverting operation, and the control device sets the first traveling instruction to 0 when speed information indicating a traveling state of the work vehicle becomes the determination information.

2. The work vehicle according to claim 1, wherein the determination information increases, as the information upon detecting inverting operation increases.

3. The work vehicle according to claim 1, wherein the information upon detecting inverting operation, the determination information, and the speed information are a speed.

4. The work vehicle according to claim 1, wherein the work machine includes a fork on which a cargo is loaded, and the work vehicle is a forklift.

5. The work vehicle according to claim 1, wherein the determination information is a speed Vch of the work vehicle and the information upon detecting inverting operation is a speed Vca of the work vehicle when the inverting operation is detected, the control device determining the speed Vch based on the speed Vca and setting the first traveling instruction to 0 after detection of the inverting operation when a speed Vc of the work vehicle is less than or equal to the speed Vch.

6. A work vehicle including a fork on which a cargo is loaded, the work vehicle comprising:

a hydraulic motor that drives a drive wheel for moving the work vehicle;

a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil;

a drive device that operates the operation mechanism by operating oil;

an advancing direction detection device that detects a state of an advancing direction switching device for switching a forward movement and a reverse movement of the work vehicle; and a control device that supplies a traveling instruction for allowing the work vehicle to travel to the drive device to operate the operation mechanism in order to discharge the operating oil from the traveling hydraulic pump, wherein an operation amount of the operation mechanism is determined by the traveling instruction and a load of the closed circuit, and the control device obtains determination speed from a speed upon detecting inverting operation, the speed upon detecting inverting operation being a speed of the work vehicle when the advancing direction detection device detects an inverting operation of the advancing direction switching device for inverting the advancing direction of the work vehicle while the work vehicle travels, the control device decreases a first traveling instruction for allowing the work vehicle to travel in the advancing direction of the work vehicle upon the detection of the inverting operation, and increases a second traveling instruction for allowing the work vehicle to travel in the direction opposite to the advancing direction of the work vehicle upon the detection of the inverting operation, after detecting the inverting operation, the control device sets the first traveling instruction to 0 when the speed of the work vehicle becomes the determination speed, and the control device sets the first traveling instruction to 0 in a case where the speed of the work vehicle is not more than a predetermined value, a pressure at an intake side of the traveling hydraulic pump is not more than a predetermined value, a pressure at a discharge side of the traveling hydraulic pump is not more than a predetermined value, and a pressure of the operating oil generated by the drive device is not more than a predetermined value, when the inverting operation is detected upon an occurrence of abnormality on a device detecting the speed.

7. A control method for a work vehicle including a work machine; a hydraulic motor that drives a drive wheel for moving the work vehicle; a traveling hydraulic pump that is a pump forming a closed circuit with the hydraulic motor, and discharging operating oil to drive the hydraulic motor, the traveling hydraulic pump including an operation mechanism that changes a capacity of the pump and changes a rotating direction of the hydraulic motor by inverting an intake side and a discharge side of the operating oil; an advancing direction detection device that detects a state of an advancing direction switching device for switching a forward movement and a reverse movement of the work vehicle; and a control device that supplies a traveling instruction for allowing the work vehicle to travel to a drive device of the operation mechanism to operate the operation mechanism in order to discharge the operating oil from the traveling hydraulic pump, an operation amount of the operation mechanism being determined by the traveling instruction and a load of the closed circuit, the control method comprising:

obtaining determination information from information upon detecting inverting operation, the information upon detecting inverting operation indicating a traveling state of the work vehicle when the advancing direction detection device detects an inverting operation of the advancing direction switching device for inverting the advancing direction of the work vehicle while the work vehicle travels, decreasing a first traveling instruction for allowing the work vehicle to travel in the advancing direction of the work vehicle upon the detection of the inverting operation, and increasing a second traveling instruction for allowing the work vehicle to travel in the direction opposite to the advancing direction of the work vehicle upon the detection of the inverting operation, after the detection of the inverting operation, and setting the first traveling instruction to 0 when speed information indicating a traveling state of the work vehicle becomes the determination information.

\* \* \* \* \*